United States Patent [19]
Kulig et al.

[11] 3,826,381
[45] July 30, 1974

[54] ARTICLE HANDLING APPARATUS

[75] Inventors: Constantine W. Kulig, Windsor, Conn.; Lyman L. Campbell, East Longmeadow, Mass.

[73] Assignee: Emhart Corporation, Bloomfield, Conn.

[22] Filed: Mar. 30, 1972

[21] Appl. No.: 239,643

[52] U.S. Cl. .......................... 214/1 BT, 294/64 R
[51] Int. Cl. .............................................. B66c 1/02
[58] Field of Search ....... 294/64 A, 64 R; 214/1 BS, 214/1 BT, 1 BH, 1 BV, 650 SG

[56] References Cited
UNITED STATES PATENTS

| | | | |
|---|---|---|---|
| 2,578,220 | 12/1951 | Billner | 294/65 |
| 2,715,038 | 8/1955 | Billner | 294/65 |
| 3,235,057 | 2/1966 | Rea | 198/20 R |
| 3,291,518 | 12/1966 | Weinert | 294/64 R |
| 3,716,147 | 2/1973 | Pipes | 214/1 BT |

*Primary Examiner*—Robert G. Sheridan
*Assistant Examiner*—George F. Abraham
*Attorney, Agent, or Firm*—McCormick, Paulding & Huber

[57] ABSTRACT

An article handling apparatus which is used to transfer a plurality of articles, such as glass containers which may be in a heated condition, from a pickup position which may be over a first conveyor to a discharge position which may be over a second conveyor employs a plurality of vacuum pickup heads mounted on a movable carriage. A drive mechanism connected to the carriage moves the plurality of pickup heads into laterally adjacent and embracing relationship with the articles at the pickup position so that one article is embraced in each of the respective heads. The drive mechanism then raises the carriage and the embraced articles so that they are held in a suspended condition and moves the carriage from the first conveyor to the discharge position where the articles are lowered onto the second conveyor. As the carriage lowers the embraced articles, the source providing the vacuum is disconnected from the plurality of heads and the articles are deposited at the discharge position.

In order to minimize the capacity of the vacuum system, each of the plurality of vacuum pickup heads contains a valve and an actuating element which opens the valve to produce a localized vacuum within the head when an article to be embraced is located in closely spaced relationship with the head. The drive means for moving the plurality of heads on the carriage sweeps the heads at the appropriate time into closely spaced relationship with the articles as they move along the first conveyor. When the actuating elements of the valves are contacted by the articles, the valves open and the full effect of the vacuum source is available to draw the articles into embracing relationship with the pickup heads.

12 Claims, 7 Drawing Figures

ARTICLE HANDLING APPARATUS

BACKGROUND OF THE INVENTION

The present invention relates to apparatus that is used for handling articles of manufacture which are produced and handled in large quantities. More particularly, the apparatus of the present invention is concerned with the transfer of such articles in groups between two locations during cyclic transfer operations.

In many manufacturing and similar operations where large quantities of articles are moved about, it is customary to employ conveyor systems to move the articles from one point to another and to translate the articles through inspection or treatment equipment while certain operations are performed on the articles. Because of the physical limitations of conveyors, it is frequently necessary to employ some special equipment to transfer the articles between conveyors. For example, U.S. Pat. application Ser. No. 146,420, filed May 24, 1971, now U.S. Pat. No. 3,687,262 entitled "Article Handling Apparatus" and having the same assignee as the present invention discloses an apparatus that can be used in the manufacture of glass bottles for transferring the bottles between two conveyors arranged in perpendicular relationship. The apparatus employs a pusher bar and a deadplate which spans the gap between the two conveyors and the mechanism is driven in synchronism with the bottle motions on the conveyors so that groups of the bottles are pushed off of one of the conveyors onto the other in a cyclic operation.

While pusher bar assemblies are capable of transferring newly formed ware, such a transfer operation between two conveyors or between a pickup and discharge point involves sliding the articles across a surface such as the upper side of a deadplate and can result in scuffing or scratching of the bottom portion of the article which moves in sliding contact with the surface. In the case of newly formed glass containers or bottles, thermal checks produced by the scuffing in the bottom portion may be the cause of a container failure at a later point in the processing operations or after the bottle has been filled.

It is readily apparent that scuffing or scratching a newly formed glass bottle should be avoided in order to prevent problems with the article in places such as the beverage lines where the bottles are filled and subjected to internal pressure. For this reason transfer mechanisms employing pusher bars are not always desirable along conveyor lines handling newly formed glassware, and, instead, mechanisms employing tongs which engage the bottles about their finishes are sometimes used. Again, however, in the case of newly formed glassware, the tongs may cause thermal checks in the articles unless a great deal of attention is paid to the setting up and maintenance of the pickup mechanism to insure that the metal tongs are properly adjusted and not bent or broken or that the insulating materials lining the tongs are not worn away. Furthermore, pickup type transfer mechanisms employing tongs represent a high initial cost.

It is, accordingly, a general object of the present invention to disclose an article handling apparatus which is capable of actually lifting a plurality of articles off of one conveyor and depositing them on another conveyor without scuffing or scratching the articles either on their bottoms or at any point of contact with the apparatus.

SUMMARY OF THE INVENTION

The present invention relates to an article handling apparatus for transferring groups of articles in a suspended condition between two positions. The apparatus is comprised of a movable carriage on which a plurality of vacuum operated pickup heads are mounted in serially adjacent relationship to meet and at least partially embrace a corresponding plurality of articles arranged in serially adjacent relationship. A vacuum source is connected to each of the vacuum heads, each of which contains a valve for turning the vacuum on and off at the head. Each head also contains a support member which is brought into embracing relationship with the article and an actuating element which connects with the valve and projects from an opening in the supporting member to open the valve and turn the vacuum on whenever the element is contacted by an article to be embraced in the support member. The carriage with the plurality of vacuum heads is moved by a drive means which brings the plurality of heads into laterally adjacent and embracing relationship with the plurality of articles at a pickup position, which may lie over one of two conveyors, and then moves the embraced articles in a suspended condition from the pickup position to a discharge position, which may lie over the other of the two conveyors.

By providing an actuating element in each of the vacuum pickup heads for turning the vacuum on as an article is received within the support member, the capacity of the vacuum source is greatly reduced and the full effect of the source is made available at each of the pickup heads and at the point in time when it is needed to draw an article tightly into embracing relationship with the support member on the head. Since there is no sliding of the article and since the article is held by the vacuum, or the pressure differential created by the vacuum, against the support member which may have a relatively large contact surface, the chances of damaging or scuffing the article during the transfer process are greatly minimized.

DESCRIPTION OF THE PREFERRED EMBODIMENTS

Figure 1:
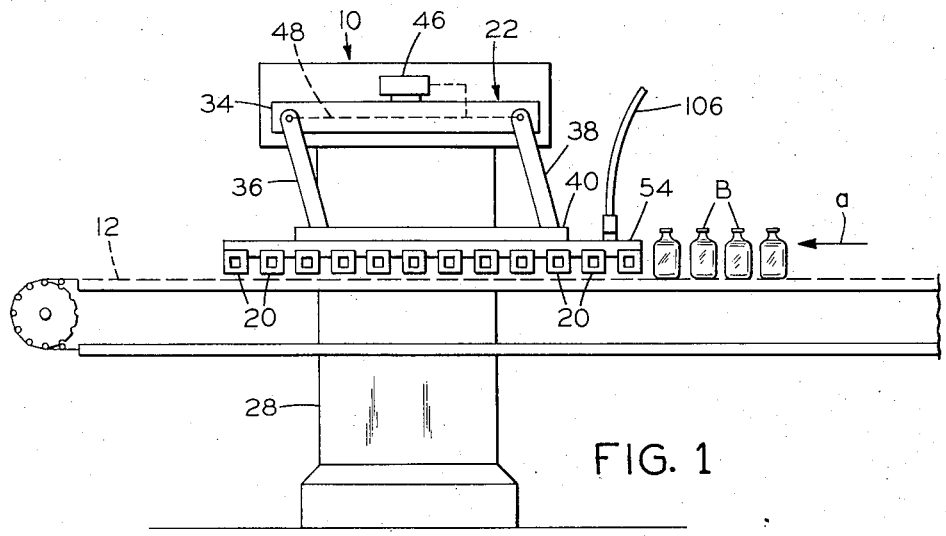
FIG. 1 is a front elevational view showing one embodiment of the article handling apparatus operating adjacent a cross conveyor carrying newly formed glass bottles.
Figure 2:
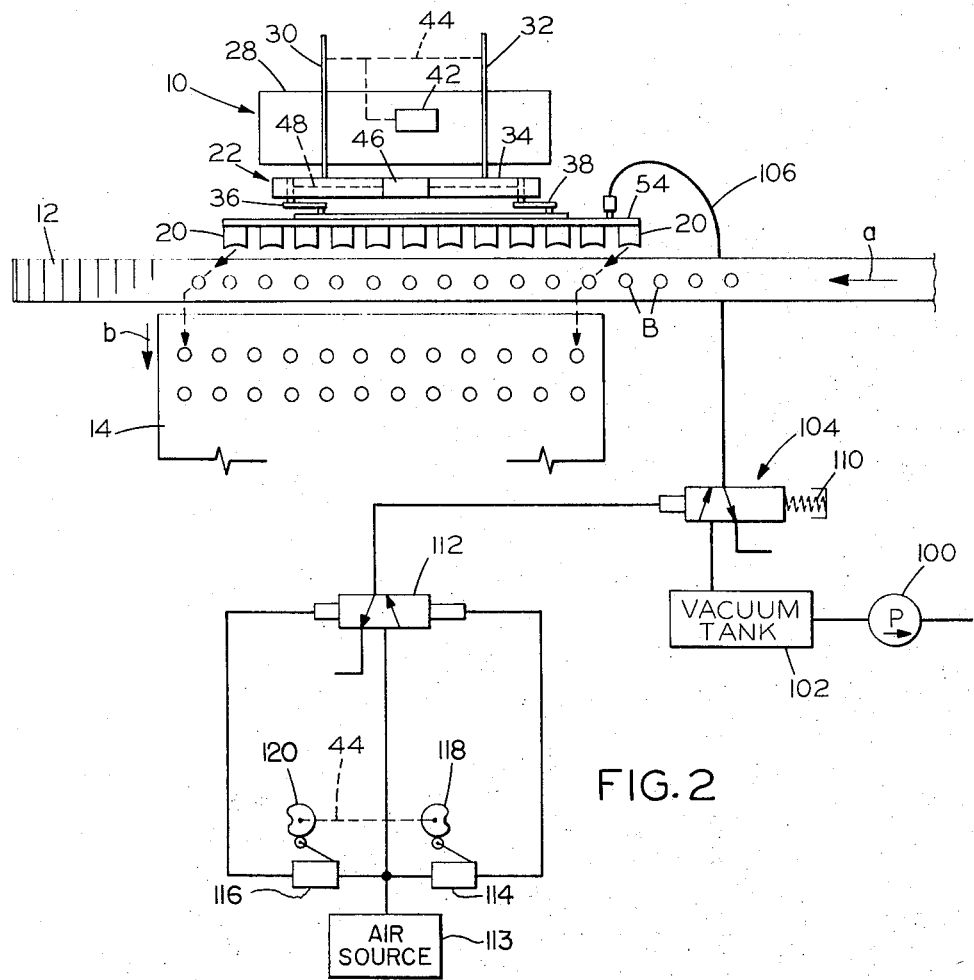
FIG. 2 is a top plan view showing the article handling apparatus transferring glass bottles from the cross conveyor of FIG. 1 to a lehr conveyor.
Figure 3:
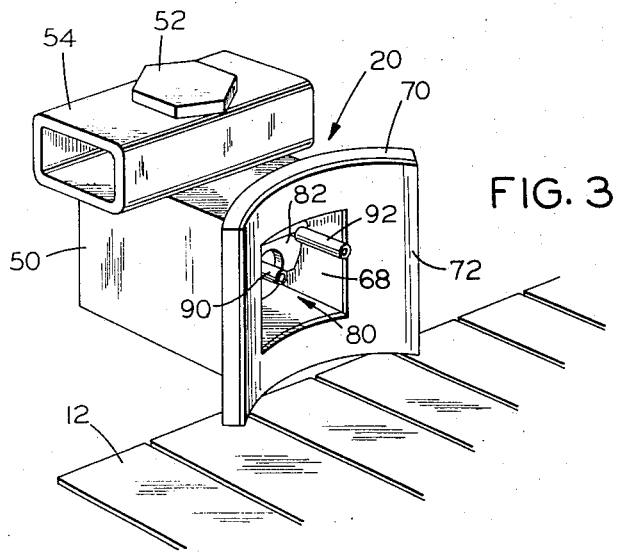
FIG. 3 is a fragmentary perspective view showing one of the vacuum pickup heads of the article handling apparatus.

FIGS. 1 and 2 show an article handling apparatus, generally designated 10, constructed in accordance with the present invention and operating adjacent a cross conveyor 12 on which a plurality of articles, specifically glass bottles B, are translated horizontally in the direction indicated by the arrow *a*. It will be presumed for the purposes of explanation that the bottles B are newly formed bottles deposited on the cross conveyor 12 from a I. S. glassware forming machine having six double-gob molds producing 12 bottles during each forming cycle. As a consequence, the bottles B in a heated condition appear on the conveyor in front of the handling apparatus 10 in series of 12 after each forming cycle of the I. S. machine.

It is the function of the apparatus 10 to move groups of twelve bottles in a suspended condition from the cross conveyor 12 onto the end of the lehr conveyor 14 shown moving in the direction of arrow *b* in FIG. 2 and on which the bottles are arranged in ranks of twelve for annealing in a standard glassware lehr. Of course, while the article handling apparatus 10 is described as operating between a cross conveyor and a lehr conveyor, it may be suitably used in other environments where it is desirable to move a group of bottles in a suspended condition.

The article handling apparatus 10 includes a plurality of vacuum pickup heads 20 mounted in serially adjacent relationship to a movable carriage 22. The carriage 22 is connected to a drive mechanism which causes the pickup heads 20 to be swept along the cross conveyor 12 at the same speed as the bottles on the conveyor and also across the conveyor so that each of the vacuum heads 20 traces a diagonal transfer path from a starting position at one side of the conveyor 12 across the conveyor 12 toward the lehr conveyor 14 as illustrated in the plan view of FIG. 2. During the interval in which the vacuum heads move over the cross conveyor 12, they are brought into at least a partially embracing relationship with the bottles B and pickup the bottles to carry them in a suspended condition. As the vacuum heads approach the lehr conveyor, the carriage 22 ceases to move parallel with the conveyor 12 but continues to move toward the adjacent end of the lehr conveyor as indicated. When the bottles are over the discharge position, the carriage 22 lowers the vacuum heads and the heads release the bottles. The motions of the carriage 22 at the discharge position have the same direction and approximately the same speed as the lehr conveyor to minimize bottle disturbance. Once the bottles are deposited on the lehr conveyor, the carriage 22 moves the vacuum heads back across the conveyor 12 to the starting position illustrated in FIGS. 1 and 2 so that the movement of the bottles from a pickup position over the conveyor 12 to the discharge position over the conveyor 14 is repeated in a cyclic fashion. The timing of the cyclic operation is controlled from the I. S. machine so that the pickup heads 20 move into laterally adjacent relationship with each complement of twelve bottles at the appropriate time. Each complement of bottles transferred by the apparatus 10 forms a single rank of bottles on the much wider lehr conveyor 14. As a consequence, the lehr conveyor 14 may be driven at a speed which is only one-half of that of the conveyor 12, a situation which is generally desirable in a conventional lehr to provide for maximum annealing time.

The carriage 22 is supported from a structural frame 28 of the apparatus 10 at a position laterally adjacent the cross conveyor 12 and opposite the loading end of the lehr conveyor 14. The frame 28 may include jacks and leveling equipment which permit the vacuum heads 20 to sweep parallel to the moving surfaces of the conveyors 12 and 14.

The carriage 22 includes a pair of parallel rails 30 and 32 which slide or travel relative to the frame 28 in a direction transverse to the cross conveyor 12. The front ends of the rails 30 and 32 are interconnected by a fixed link 34 forming a part of a parallel-crank four bar linkage from which the plurality of vacuum heads 20 are suspended. Two parallel crank arms 36 and 38 are pivotally connected to the fixed link 34 and an orbital link 40 so that the vacuum heads can be swept in a direction parallel to the movement of the bottles on the conveyor 12 at the same time that the heads move into laterally adjacent relationship with the bottles. As described in greater detail below, the carriage 22 is also adjusted vertically as it moves the vacuum heads across the conveyor 12 and over the loading end of the lehr conveyor 14 to lift the bottles B and hold them in a suspended condition between the pickup and discharge positions.

The drive mechanism shown in FIGS. 1 and 2 for moving the carriage 22 includes an electrical motor 42 connected to the rails 30 and 32 by means of a mechanical linkage 44 and a pneumatic motor 46 connected to the crank arms 36 and 38 by means of a mechanical linkage 48. The motor 42 and linkage 44 control the motions of rails 30 and 32 while the pneumatic motor 46 and linkage 48 control the rotation of crank arms 36 and 38. While a number of different drive mechanisms can be used to produce the desired motions of the carriage 22 and the pickup heads 20, a mechanism of this type particularly suited to the transfer operation disclosed is shown and described in greater detail in the copending application Ser. No. 146,420 referenced above and the description in the copending application is incorporated herein by reference.

Reference to FIGS. 3–6 discloses the construction of one of the vacuum pickup heads 20 which picks up one of the bottles B. Since each of the pickup heads has the same construction and operates in the same manner, the following description is limited to one such head, but is applicable to each of the heads.

The pickup head 20 has a structural housing or body 50 connected by means of a ported mounting bolt 52 to a vacuum manifold 54 secured to the orbital link 40 of the carriage 22. The spacing of each of the mounting bolts 52 and correspondingly each of the vacuum heads 20 is selected to correspond with the spacing of the bottles B as they are deposited on the conveyor 12 from the forming machine. An O-ring 56 captured between the bolt 52 and the vacuum manifold 54 and an O-ring 58 captured between the manifold and the body 50 provide air-tight seals. An axially extending channel 60 within the mounting bolt 52 and having a lateral port 62 interconnects the interior of the manifold 54 with a bore 64 receiving the bolt 52 in the body 50. Two transverse channels 66 from the bore 64 lead to a body cavity 68 facing toward the bottles B at the pickup position over the conveyor 12. The cavity 68 leads to an opening defined in a bottle support member 70 formed as an integral part of the body 50. In order to at least partially embrace a bottle B in close fitting relationship over a broad area, the support member 70 is specially contoured to mate with the body contour of the bottle and, in the example illustrated, has the shape of a cylindrical section corresponding to the cylindrical body of the bottle. Of course, it will be readily recognized that the support member 70 could be detachable so that support members having different contours corresponding with differently shaped bottles could be mounted on the same pickup head. Lining the cylindrical contour of the support member 70 is a composite resilient and heat resistant material 72 which forms a seal with the body of the bottle when the bottle is brought into embracing relationship with the head 20. The large contact area between the bottle and the support member 70 provides a large sealing surface about the cylindrical body of the bottle to prevent loss of vacuum when the head 20 engages a bottle.

To individually control the vacuum within each of the pickup heads 20, a valve 80 of the flapper type is mounted within the pickup head cavity 68. The flapper 82 of the valve 80 is pivotally mounted to the body 50 on a pivot shaft 84 and moves between the closed position illustrated and an open position shown in phantom in FIG. 4. In the closed position, the flapper 82 isolates the channels 66 and vacuum manifold 54 from the cavity 68, and in the open position places the manifold 54 in communication with the cavity 68. In this respect, the term "vacuum" as used throughout the specification refers to a low pressure condition of perhaps 7 to 10 pounds per square inch below atmospheric pressure.

A toggle weight 86 is connected to the upper side of the flapper 82 and passes through an over-center position above the shaft 84 as the flapper moves between the opened and closed positions. The toggle weight 86, therefore, tends to hold the flapper in the condition to which it is actuated.

Also connected to the upper side of the flapper 82 are a pair of teflon-coated actuating rods 90 and 92 which project through the opening in the support member 70 and the lining 72 when the flapper 82 is closed. When the flapper 82 rotates on the shaft 84 to its open position, however, the actuating rods 90 and 92 rotate with the flapper to a position lying wholly within the cavity 68. It will be observed that when the flapper 82 is in the closed position and a bottle B is approached by the pickup head 20, the bottle will contact the actuating rods 90 and 92 and urge the flapper to the open position. The teflon coatings on the projecting ends of the rods contact the bottles and, therefore, will prevent thermal checks from being produced in a bottle when it is brought into embracing relationship with a pickup head 20 in which the valve 80 is closed.

The operations of the vacuum pickup heads 20 and the motions of the article handling apparatus 10 are described in conjunction with the vacuum control components shown in FIG. 2. The vacuum pump 100 evacuates a vacuum tank 102 continuously during the period in which the apparatus 10 is in operation. A gate valve 104 and a flexible vacuum hose 106 connect the vacuum manifold 54 on the carriage 22 with the vacuum tank 102 so that the entire manifold 54 can be evacuated or vented to atmosphere through the gate valve 104. The valve 104 is biased by a spring 110 toward the venting position in which the manifold 54 is opened to the atmosphere. In this condition, the pickup heads 20 are not capable of supporting the bottles.

A control valve 112 on command supplies pressurized air from a source 113 to the spool of the gate valve 104 to reposition the spool so that the vacuum tank 102 communicates through the flexible vacuum hose 106 with the manifold 54. The timing of the control valve operations is determined by two cam-operated tripping valves 114 and 116 which are operated respectively by cams 118 and 120 driven from the motor 42 and linkage 44. The cams 118 and 120 make one revolution during each transfer cycle of the apparatus 10. As the carriage 28 begins to move the vacuum pickup heads 20 diagonally across the conveyor 12, the cam 118 operates trip valve 114 to shuttle the valves 112 and 104 and interconnect the vacuum tank 102 and hose 106 through the gate valve 104. The pickup heads 20, therefore, become "energized" as the bottles B on the conveyor 12 are embraced by the support members 70.

Assuming that the flapper valve 80 is closed as a pickup head 20 approaches a bottle, the bottle initially makes contact with the actuating rods 90 and 92 and pushes the flapper 82 from its closed to its open position. The cavity 68 is, therefore, suddenly evacuated since the body of the bottle tends to restrict the flow of air over the support member 70 into the cavity. Consequently, the bottle is pulled rapidly against the resilient lining 72 of the support member 70 and completely seals off the cavity 68. The full effect of the vacuum holds the bottle B tightly embraced within the support member.

It will be readily understood that the preferred contour of the support member is determined by the contour of the body of the bottle so that the cavity 68 is effectively sealed by the bottle during the transfer operation. If needed, a set of guide members may be connected to the body 50 of the pickup head 20 to insure that a bottle is properly guided into the embraced position when, for example, the bottle has not been accurately spaced or positioned on the conveyor 12. It should also be noted that the side of the channels 66 and the size of the toggle weight 86 determine the forces which tend to hold the flapper 82 in the closed position. The total of the forces holding the valve closed must not exceed the sliding friction forces between the bottle and the conveyor so that the valve is pushed opened by the bottle when a pickup head 20 approaches.

If a bottle does not appear in front of one of the pickup heads 20, as in the case where one section of an I.S. machine is shut down, the flapper 82 automatically closes as the vacuum in the manifold 54 produces a flow of air over the lower half of the flapper and draws the lower half toward the open ends of the channels 66. Until another bottle appears in front of the pickup head, the toggle weight 86 holds the flapper in the closed position even after the pressure within the manifold 54 reaches atmospheric pressure. During the subsequent transfer cycle when the manifold 54 is again evacuated there is no leakage through the pickup head and no energy is expended in again closing the flapper. The valve 80, consequently, limits the amount of air that must be pumped to evacuate manifold 54. Limiting the flow of air in this manner in the continuously operating article handling apparatus avoids the requirement for a continuous-duty vacuum pump with exceptionally high capacity and the full effect of the vacuum at those pickup heads which actually embrace a bottle. When bottles appear repeatedly in front of a pickup head, the toggle weight 86 reduces the tendency for the flapper 82 to close and push the rods 90 and 92 into the bottles.

Figure 7:
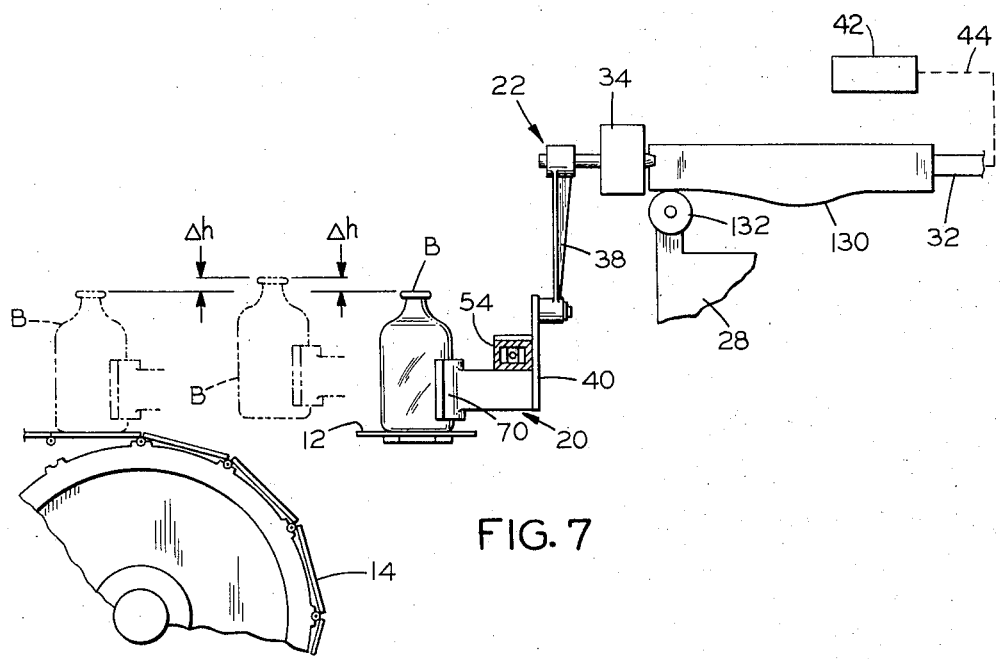
FIG. 7 is a side elevation view of the vacuum pickup head and shows a portion of the drive mechanism which elevates the head and an embraced article as they move between the two conveyors.

Once the bottles have been embraced by the pickup heads 20, the drive mechanism of the apparatus 10 elevates the manifold 54 and the vacuum heads 20 so that the bottles are lifted off of the cross conveyor 12. In one embodiment of the invention shown in FIG. 7, the elevating motion is derived from a pair of lifting cams 130 (only one shown) connected respectively to the rails 30 and 32 which shift the carriage 22 in the transverse direction relative to the conveyor 12. As the rails 30 and 32 are driven toward the conveyor 12 relative to the frame 28 of the apparatus 10 by the motor 42 and linkage 44, and the crank arms 36 and 38 sweep the pickup heads 20 in a direction parallel with the conveyor 12, the cams 130 ride over a roller 132 mounted to the frame 28 and the profiles of the cams cause the carriage 22 and the embraced bottles to be elevated. When the bottles reach the discharge position over the lehr conveyor 22, the profiles of the cams 130 cause the pickup heads 20 to lower the bottles to the conveyor surface. It should be noted that the profile of the cams 130 must also compensate for the vertical displacement of the link 40 caused by the arcuate movement of the crank arms 36 and 38. The net displacement of the bottles B in the vertical direction is represented in FIG. 7 by the height differential $\Delta h$ between the bottle positions on the two conveyors 12 and 14 and the position midway between the two conveyors. It will also be understood that if the supporting surfaces of the conveyors 12 and 14 are at different elevations, the profile of cams 130 can compensate for such difference.

Once the carriage 22 has lowered the pickup heads 20 with the embraced bottles at the discharge position over the lehr conveyor 14, the cam 120 in FIG. 2 actuates trip valve 116 to shuttle the control valve 112 and relieve the air pressure holding the spool in the gate valve 104 against the biasing spring 110. The gate valve then vents the vacuum manifold 54 to atmosphere and relieves the vacuum within the pickup heads 20. With the pickup heads "deenergized," the bottles B become disengaged from the pickup heads and proceed to move on the lehr conveyor 14.

The pneumatic motor 46 and linkage 48 then swing the crank arms 36 and 38 to a position in which they are almost horizontal so that the vacuum manifold 54 and the pickup heads 20 are elevated above the tops of the bottles B moving into position adjacent the apparatus 10 for the next transfer operation. The rails 30 and 32 are then drawn toward the apparatus 10 to return the pickup heads to the side of the conveyor 12 adjacent the apparatus and the crank arms 36 and 38 rotate the pickup heads down to the starting position in preparation for a subsequent transfer cycle.

It will be observed that the vacuum pump 100 continues to run throughout a complete transfer operation and since the gate valve 104 closes the vacuum tank 102 when the vacuum hose 106 is vented to atmosphere, the vacuum pump is given an additional amount of time to reduce the pressure within the tank.

While the apparatus 10 has been disclosed and described above in a transfer operation where the bottles are loaded onto a lehr conveyor 14, it is also contemplated that the apparatus could be utilized to unload or remove the bottles from the discharging end of the lehr conveyor. In such case, the motions of the carriage 22 would be reversed to cause the pickup heads 20 to track the transfer paths described with respect to FIG. 2 in the opposite direction. Also, the vacuum control would be reversed so that the pickup heads become "energized" at a pickup position over the lehr conveyor and "deenergized" over the cross conveyor. In order to correctly time the energization of the pickup heads over the lehr conveyor, a photodetector mounted adjacent the pickup position at the discharge end of the lehr conveyor may be used to sense the interruption of a light beam by the rank of bottles to be picked up.

Figure 4:
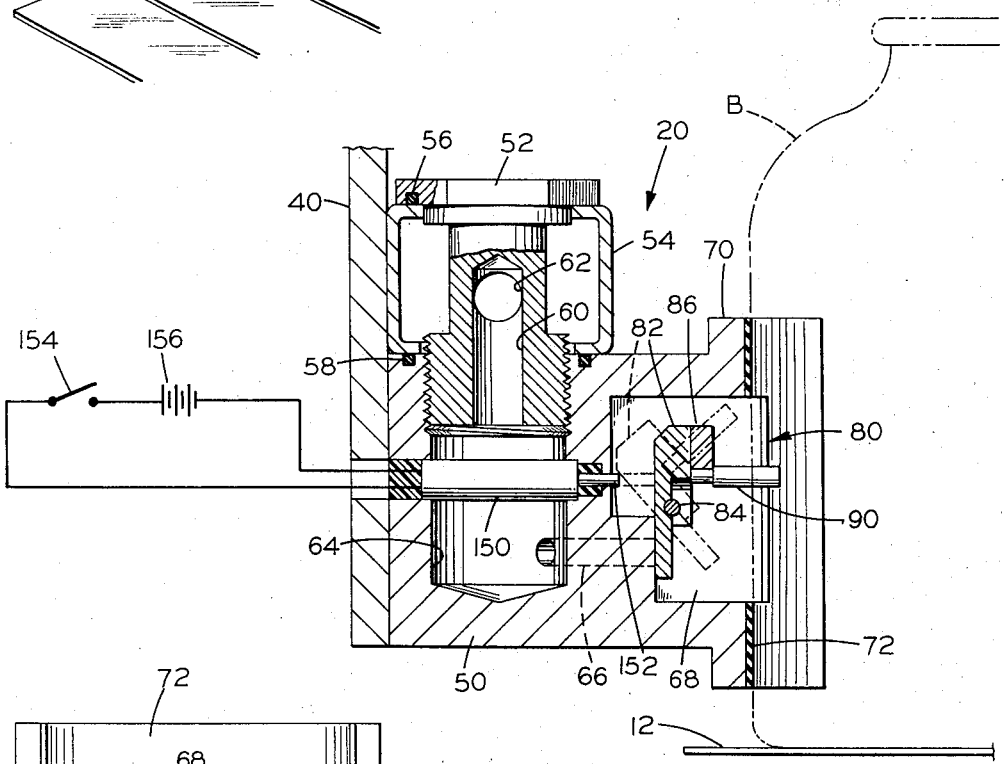
FIG. 4 is a side elevation view of the vacuum pickup head in FIG. 3.
Figure 5:
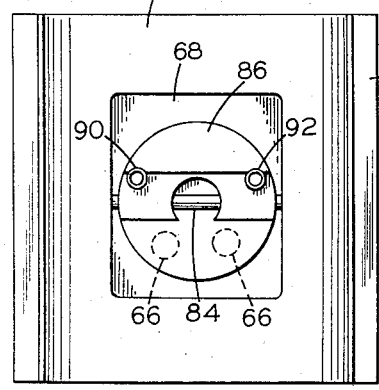
FIG. 5 is a front elevation view of the vacuum pickup head in FIG. 3.
Figure 6:
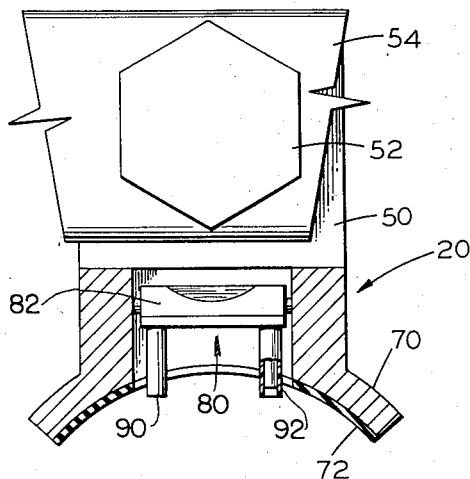
FIG. 6 is a top plan view of the vacuum pickup head in FIG. 3.

The pickup heads 20 may also be modified to selectively reject or bypass bottles on the conveyors. As shown in FIG. 4, an electrical solenoid 150 having an actuating plunger 152 may be installed in sealed relationship within the body 50 of the pickup head. By connecting the solenoid 150 in series with a control switch 154 and a battery 156, the solenoid may be selectively energized to cause the plunger 152 to push the flapper 82 to the closed position. When a bottle B attempts to push against the actuating rods 90 and 92 and open the flapper, the solenoid 150 prevents the movements of the flapper and the generation of the necessary vacuum within the cavity 68 to capture the bottle in embracing relationship with the head. As long as the control switch 154 remains energized, all bottles registering with the pickup head will be merely pushed or allowed to fall off of a supporting conveyor into a cullet chute between the two conveyors. The reject solenoid is particularly useful where one mold of a molding machine is not operating properly and continually produces an imperfect bottle. Since the bottles from a given mold appear at the same position in each series or group of bottles picked up by the apparatus 10, the same pickup head will register with the imperfect bottle during each transfer cycle. As long as the control switch 54 for that particular pickup head is held closed, the imperfect bottles will be rejected.

It will thus be seen that the article handling apparatus 10 picks up each of the individual bottles during the transfer operation and thereby minimizes the risk of checking or otherwise damaging the bottoms of the bottles. The apparatus also avoids the use of tongs which could damage the finish of the bottles and at the same time provides a broad surface area on the support members 70 to distribute the forces which hold the bottles in the suspended condition. The apparatus employing the vacuum pickup heads eliminates the clashing of bottles against one another and other supporting structure, and retains its practical aspects by the use of individual flapper valves in each pickup head to minimize the capacity of the continuous-duty vacuum system.

While the present invention has been described in several preferred embodiments, it will be readily understood that still further modifications and substitutions can be had without departing from the spirit of the invention. The drive mechanisms for moving the plurality of pickup heads and the timing of the pickup operations can be varied to suit the particular speeds and positions of the conveyors between which the bottles or other articles are moved. Accordingly, the present invention has been described in several preferred embodiments by way of illustration rather than limitation.

We claim:

1. Article handling apparatus for transferring groups of articles, such as glass containers, in a suspended condition between two positions comprising: a movable carriage; a vacuum source; a plurality of vacuum pickup heads mounted in serially adjacent relationship on the carriage, each of the vacuum heads being connected with the vacuum source and having a support member adapted to at least partially embrace an article and a valve operable between open and closed conditions, the support member defining an opening covered by an embraced article, and the valve being interposed between the vacuum source and the opening and having an actuating element projecting through the opening of the support member in the closed condition of the valve and moved by an embraced article to open the valve whereby an embraced article is drawn toward the opening and held tightly against the support member by the reduced pressure in the opening caused by the open valve and the vacuum source; means for closing the valve in a selected vacuum pickup head on the carriage to render the selected head inoperative; and drive means connected to the movable carriage for moving the plurality of vacuum heads into laterally adjacent and embracing relationship with the articles at a pickup position and moving the embraced articles in a suspended condition from the pickup position to a discharge position.

2. An article handling apparatus as defined in claim 1 wherein the movable carriage comprises an elongated vacuum manifold connected with the vacuum source; and the plurality of vacuum pickup heads are connected in adjacent relationship to the vacuum manifold.

3. An article handling apparatus as defined in claim 1 wherein each of the vacuum heads comprises a body including the support member and defining a cavity having a communication with the vacuum source and exposed by the opening in the support member; and each of the valves in the vacuum heads comprises a flapper valve mounted within the cavity of the body and closing the communication with the vacuum source in the closed condition.

4. An article handling apparatus as defined in claim 3 wherein the flapper valve has a pivotal flapper movable within the cavity of the body between a closed position covering the communication with the vacuum source and an open position; and the actuating element of the valve is connected to the pivotal flapper and extends through the cavity of the body and the opening of the support member at the closed position of the valve.

5. An article handling apparatus as defined in claim 4 wherein the pivotal flapper of the valve includes a toggle weight which moves through an over-center position as the flapper moves between the open and closed conditions whereby the toggle weight tends to hold the flapper in the condition to which the flapper is actuated.

6. An article handling apparatus as defined in claim 1 adapted for handling bottles wherein the support member of each vacuum pickup head has a specially contoured section conforming to the shape of a bottle portion embraced by the support member.

7. An article handling apparatus defined in claim 6 wherein the specially contoured section of the support member is lined with a heat resistant, resilient material.

8. An article handling apparatus as defined in claim 6 wherein the specially contoured section of the support member is a cylindrical section.

9. An article handling apparatus as defined in claim 1 wherein a vacuum manifold connected with the vacuum source is mounted on the carriage, and each of the vacuum pickup heads is connected to the vacuum manifold; and vacuum control means responsive to the drive means are interposed between the vacuum source and the vacuum manifold for evacuating the manifold when the carriage is moved to the vicinity of the pickup position and relieving the vacuum in the manifold when the carriage is moved to the vicinity of the discharge position.

10. An article handling apparatus as defined in claim 9 wherein the drive means comprises cyclic drive means for cyclically moving the plurality of vacuum heads between the pickup and discharge positions and for cyclically moving articles in a suspended condition.

11. An article handling apparatus as defined in claim 1 wherein: the valves in the pickup heads are flapper valves; and the means for closing comprises an electrically actuated solenoid having a plunger cooperating with the flapper of the valve in an individual head.

12. An article handling apparatus as defined in claim 1 wherein: the means for closing the valve comprises means opposing the operation of the actuating element moved by an embraced article for preventing the opening of the valve in the selected pickup head.

* * * * *